PATENT OFFICE.

ADOLF WÜNSCHE, OF CHARLOTTENBURG, GERMANY, ASSIGNOR TO SIEMENS & HALSKE ACTIENGESELLSCHAFT, OF BERLIN, GERMANY.

PROCESS OF MANUFACTURING OBJECTS FROM ASBESTOS.

SPECIFICATION forming part of Letters Patent No. 684,032, dated October 8, 1901.

Application filed July 20, 1901. Serial No. 69,052. (No specimens.)

*To all whom it may concern:*

Be it known that I, ADOLF WÜNSCHE, engineer, a subject of the German Emperor, residing at 2 Spandauerstrasse, Charlottenburg, near Berlin, Germany, have invented certain new and useful Improvements in Processes of Manufacturing Objects from Asbestos; and I do hereby declare the following to be a full, clear, and exact description of the invention, such as will enable others skilled in the art to which it appertains to make and use the same.

In order to manufacture objects from asbestos fiber pulp or paste, a binding material must be used, since asbestos fibers cannot be felted like those of animal origin by aid of heat, water, and pressure. Hitherto glue, gum, starch, or other organic agglutinant or a solution of soluble glass has been used for this purpose; but if the object is to be used in contact with liquids such soluble binding materials are ill adapted, since the object swells and is finally disintegrated. This happens, for example, in the case of asbestos plates manufactured with cementitious matter of the kind named when such plates are used as diaphragms in electrolytic apparatus. Soluble glass is equally insufficient as a binding material for the purpose in question, whether it is used by itself or in conjunction with acids or salts which separate from it the silica it contains. The silica or silicic acid separated from soluble glass is by no means stable, being easily soluble in alkaline liquids. Besides, objects of asbestos made with aid of soluble glass lose considerably in porosity.

The present invention relates to the application of silicon tetrafluorid as a cement for uniting or felting, as it were, asbestos fibers. Objects manufactured with aid of this compound retain their original solidity in water and in aqueous solutions of salts and even in alkaline or feebly-acid solutions. For this reason asbestos plates made with silicon tetrafluorid by this new process are particularly fitted for use as electrolytic diaphragms. Whereas the older binding materials mentioned above are added to the asbestos pulp before the objects are fashioned, silicon tetrafluorid may be applied to the object fashioned with aid of water and pressure alone after it has dried.

The mode of applying silicon tetrafluorid as an agglutinant for asbestos fibers is quite different from that of applying the binding materials hitherto used. Whereas the use of the latter depends on the separation of a sticky substance on drying, which sticks the fibers together without affecting their surface, the action of silicon fluorid is a double decomposition with the chemical constituents of the asbestos—namely, silica, magnesia, and water. The surface of the asbestos fiber is etched. The water of hydration of the asbestos forms silica with a part of the silicon contained in the silicon tetrafluorid and hydrofluosilicic acid. To this silica is added that arising from the decomposition of the magnesium silicate in the asbestos, and both unite, probably, with magnesia to form an acid silicate, which sticks together the surfaces of the asbestos fiber where these are in contact. This may be regarded as a true felting, as the constituents of the fiber take part in the union. The hydrofluosilicic acid formed at the same time partly reacts with the magnesia liberated from the magnesium silicate, forming magnesium silico-fluorid, and partly remains unchanged. The magnesium silico-fluorid and the hydrofluosilicic acid may be separated from the mass by water or solution of alkali or may be converted in part into insoluble compounds. This action of silicon tetrafluorid on asbestos occurs, even when the latter is dry, without the aid of any other agglutinant. It is only necessary to submit the object which has been made merely by pressing the fibers in a moist condition to the action of dry gaseous silicon tetrafluorid. It is preferable, however, to use a solution of silicon fluorid, as it is then possible to use a high or low concentration accordingly as the asbestos object is to be silicious in high or low degree. Obviously the silicon tetrafluorid must be dissolved in a medium which is anhydrous, or nearly so; otherwise the compound $SiF_4$ will be decomposed. As a solvent for silicon tetrafluorid nearly anhydrous alcohol is best suited. It does not matter if by using this solvent a portion of the silicon is converted into an organic compound. The formation of silica from the silicon first occurs when the solution acts on asbestos. The solvent used for dissolving the silicon tetrafluorid is separated from the hardened object by heat and may be recovered by condensation of its vapor.

The asbestos object loses hardly perceptibly in porosity by treatment with silicon fluorid, so that the process is particularly suitable for producing electrolytic diaphragms.

Having thus described the nature of this invention and the best means I know of carrying the same into practical effect, I claim—

1. A process for manufacturing asbestos objects consisting in first fashioning the object and then submitting it to the action of silicon fluorid.

2. As a new article of manufacture asbestos objects characterized by resistance to water and chemical agents, and having their fibers cemented together by action of silicon fluorid.

In testimony whereof I have affixed my signature in presence of two witnesses.

ADOLF WÜNSCHE.

Witnesses:
HENRY HASPER,
WOLDEMAR HAUPT.

No references